United States Patent
Siegel

Patent Number: 4,654,390
Date of Patent: Mar. 31, 1987

[54] MONOMERIC PLASTICIZERS FOR HALOGEN-CONTAINING RESINS

[75] Inventor: Sanford A. Siegel, Baton Rouge, La.

[73] Assignee: The Dow Chemical Company, Midland, Mich.

[21] Appl. No.: 883,419

[22] Filed: Jul. 8, 1986
(Under 37 CFR 1.47)

Related U.S. Application Data

[62] Division of Ser. No. 640,072, Aug. 10, 1984, Pat. No. 4,620,026.

[51] Int. Cl.$^4$ .............................................. C08K 5/12
[52] U.S. Cl. ................................... 524/296; 524/298; 524/569
[58] Field of Search ................... 524/296, 298, 569

[56] References Cited

U.S. PATENT DOCUMENTS 4,398,022  8/1983  Sublett ................................ 528/302

Primary Examiner—Joseph L. Schofer
Assistant Examiner—N. Sarofim
Attorney, Agent, or Firm—D. R. Howard

[57] ABSTRACT

A composition having utility as a plasticizer for halogen-containing resins is a mixture of (a) at least two diesters of terephthalic acid or (b) at least two triesters of trimellitic acid. The diesters of terephthalic acid are represented by the general formula

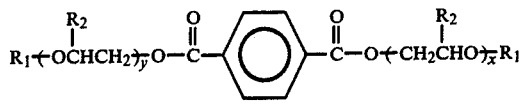

wherein $R_1$ is a phenyl radical or an aliphatic hydrocarbon radical of the formula $C_nH_m$, wherein n is an integer of 1 through 8 inclusive and m is equal to $2n+1$; $R_2$ is either hydrogen or an aliphatic hydrocarbon having one, two, three or four carbon atoms; x is an integer of 2 to 4 inclusive; y is an integer of 2 to 4 inclusive.

The trialkyl esters of trimellitic acid are represented by the general formula

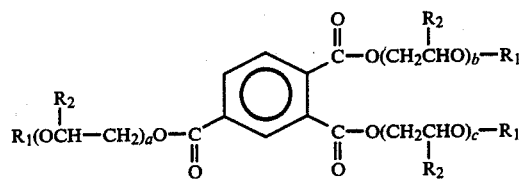

wherein $R_1$ is a phenyl radical or an aliphatic hydrocarbon radical of the formula $C_nH_m$ wherein n is an integer of 1 through 8 inclusive and m is equal to $2n+1$; $R_2$ is either hydrogen or an aliphatic hydrocarbon radical having one, two, three or four carbon atoms; a is 2, 3 or 4; b is 2, 3 or 4; and c is 2, 3 or 4. The composition provides a unique combination of properties which includes high plasticizing efficiency, low volatility, good low temperature properties and resistance to hexane extraction.

10 Claims, No Drawings

MONOMERIC PLASTICIZERS FOR HALOGEN-CONTAINING RESINS

CROSS-REFERENCE TO RELATED APPLICATION

This is a divisional of application Ser. No. 640,072, filed Aug. 10, 1984, now U.S. Pat. No. 4,620,026.

BACKGROUND OF THE INVENTION

This invention relates generally to a monomeric plasticizer for halogen-containing resins which has permanence (low volatility), low temperature flexibility, high efficiency and good alkane extraction resistance. More particularly, this invention relates to monomeric plasticizers based upon mixed esters of terephthalic acid or trimellitic acid.

A plasticizer has been defined as a material which is admixed with a plastic to increase its workability, flexibility and distensibility. The addition of a plasticizer to a plastic may lower the melt viscosity, the second order transition temperature, or the elastic modulus of the plastic.

Phthalic acid esters of monoalcohols have been widely used as plasticizers. These esters are produced by condensing aliphatic mono-alcohols containing not more than 20 carbon atoms with phthalic anhydride to form neutral products.

Dioctylphthalate, also known as DOP, is widely accepted for use in plasticizing polyvinyl chloride. It accounts for nearly one-fourth of all plasticizers produced. Since plasticization of polyvinyl chloride requires an estimated 80 percent of plasticizer production, DOP is used as a benchmark for plasticizer price/performance. In other words, acceptance of a plasticizer largely depends upon its being less expensive than DOP or its doing some specific job better than DOP.

Di-esters of ortho-phthalic acid are commonly used as plasticizers for chlorine containing polymers such as polyvinyl chloride. The esters are usually derived from alkanols containing 4 to 14 carbon atoms, e.g., isooctanol, 2-ethyl hexanol, iso-decanol and the like.

SUMMARY OF THE INVENTION

In one aspect, the present invention is a mixture of esters of terephthalic acid. Esters which comprise the mixture are represented by the following Formula I:

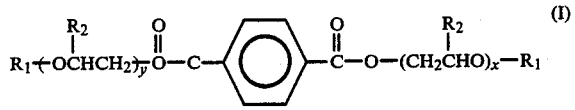

wherein $R_1$ is a phenyl radical or aliphatic hydrocarbon radical of the formula $C_nH_m$ wherein n is an integer of 1 through 8 inclusive and m is equal to $2n+1$; $R_2$ is either hydrogen or a methyl radical; x is 2, 3 or 4; and y is 2, 3 or 4. As a general rule, x and y will be equal. Satisfactory results are obtained, however, irrespective of whether x equals y.

In a second aspect, the present invention is a mixture of triesters of trimellitic acid. Triesters which comprise the mixture are represented by the following Formula II:

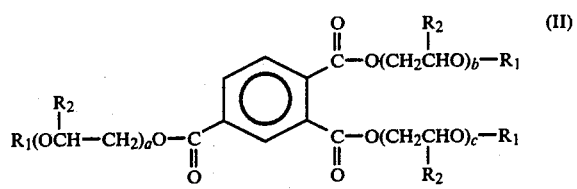

wherein $R_1$ is a phenyl radical or an aliphatic hydrocarbon radical of the formula $C_nH_m$ wherein n is an integer of 1 through 8 inclusive and m is equal to $2n+1$; $R_2$ is either hydrogen or an aliphatic hydrocarbon radical having one carbon atom; a is 2, 3 or 4; b is 2, 3 or 4; and c is 2, 3 or 4. Although a, b and c may be equal in some instances, only two of a, b and c will be equal in most compounds represented by Formula II above. Satisfactory results are obtained from any combination of a, b and c as these variables are defined herein.

The mixed terephthalic acid diesters and mixed trimellitic acid triesters of the present invention are suitable for use as plasticizers for halogen-containing resins over an extended temperature range. Accordingly, a third aspect of the present invention is a plasticized halogen-containing resin composition which comprises (a) a halogen-containing resin, such as a vinyl chloride resin, and (b) a plasticizing amount of either the aforementioned mixture of terephthalic acid esters or the aforementioned mixture of trimellitic acid esters.

The mixed terephthalic acid esters and mixed trimellitic acid esters of the present invention may also be used as processing aids. Processing aids are generally present in a composition in an amount of from about two to about ten parts per hundred parts of resin. As such, compatibility is not as critical as it is for plasticizer applications where loadings of 35 to 50 parts per hundred parts of resin and even higher are typical.

The mixed terephthalic acid esters and mixed trimellitic acid esters also have sufficient volume resistivity to allow their use as a static charge dissipator, even at processing aid level loadings.

DESCRIPTION OF THE PREFERRED EMBODIMENTS

The products represented by Formulas I and II are readily prepared using standard reaction techniques and equipment. As such, the products are prepared either by direct esterification or by transesterification. Transesterification is preferred over direct esterification because of shorter reaction times. Reaction products are recovered by conventional methods.

Diesters of terephthalic acid which are suitable for purposes of the present invention are represented by the formula

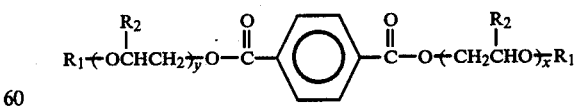

wherein $R_1$ is a phenyl radical or an aliphatic hydrocarbon radical of the formula, $C_nH_m$ wherein n is an integer of 1 through 8 inclusive and m is equal to $2n+1$, $R_2$ is either hydrogen or an aliphatic hydrocarbon radical of the formula $C_rH_s$ wherein r is an integer of 1 through 4 inclusive and s is equal to $2r+1$; x is 2, 3 or 4; and y is 2, 3 or 4. Preferred diesters of terephthalic acid are represented by the above formula wherein n is an integer of 1 through 4 inclusive and $R_2$ is either hydrogen or a methyl radical.

Triesters of trimellitic acid which are suitable for purposes of the present invention are represented by the formula

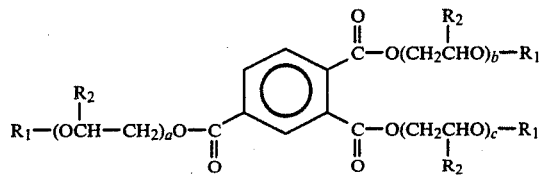

wherein $R_1$ is a phenyl radical or an aliphatic hydrocarbon radical of the formula $C_nH_m$ wherein n is an integer of 1 through 8 inclusive and m is equal to $2n+1$; $R_2$ is either hydrogen or an aliphatic hydrocarbon radical of the formula $C_rH_s$ wherein r is an integer of 1 through 4 inclusive and s is equal to $2r+1$; x is 2, 3 or 4; and y is 2, 3 or 4. Preferred esters of trimellitic acid are represented by the above formula wherein n is an integer of 1 through 4 inclusive and $R_2$ is either hydrogen or a methyl radical.

In preparing mixed terephthalate diesters by transesterification, a dialkyl terephthalate, such as dimethyl terephthalate, and a mixture of polyalkylene glycols and polyalkylene glycol monoalkyl ethers are heated to a temperature of about 235° Centigrade in the presence of a catalytic amount of calcium acetate for a short period of time while methanol is collected overhead. As the reaction proceeds, pressure is gradually reduced and excess polyalkylene glycols and polyalkylene glycol monoalkyl ethers are removed by distillation to leave a product represented by Formula I. The product may be used as is. If desired, the product may be further purified by an aqueous extraction with subsequent drying. A similar reaction is used to prepare a product represented by Formula II. Trimethyl trimellitate is not, however, readily available. Therefore, a higher, more readily available, triester, such as trioctyl trimellitate, should be used as a starting material in making products represented by Formula II.

One skilled in the art of organic chemistry could, if desired, substitute alternate starting materials and catalysts for those illustrated hereinabove to obtain alternate embodiments of products represented by Formulas I and II. Similarly, a single polyalkylene glycol or polyalkylene glycol monoalkyl ether could be used rather than a mixture thereof.

Starting materials for preparing the mixed terephthalates of the present invention by transesterification are commercially available. A mixture of diethylene glycol butyl ether, triethylene glycol butyl ether, tetraethylene glycol butyl ether, diethylene glycol, triethylene glycol, tetraethylene glycol and higher ethers and glycols is available from The Dow Chemical Company under the trade designation DOWANOL ® TBH. Other alkylene glycols and alkylene glycol monoalkyl ethers are also available from The DOW Chemical Company either singly or as mixtures thereof. Dimethyl terephthalate is available from Hercofina Chemical Company and other commodity producers.

The compositions of Formulas I and II may be used as a component of existing vinyl chloride resin formulations. The appropriate amount of such a composition is readily determined without undue experimentation. If desired, other conventional additives may be included in such formulations.

As used herein, "vinyl chloride resin" means a vinyl chloride polymer or a vinyl chloride copolymer such as a vinyl chloride/vinyl acetate copolymer, a vinyl chloride/vinylidene chloride copolymer, a vinyl chloride/ethylene copolymer or a copolymer prepared by grafting vinyl chloride onto an ethylene/vinyl acetate copolymer. The thermoplastic resin composition of this invention can also include a polymer blend of the above-mentioned vinyl chloride polymer or vinyl chloride copolymer and an olefin polymer which is a methacryl polymer or acrylonitrile-butadiene-styrene polymer (ABS resin).

The following examples are only for purposes of illustration and are not to be viewed as limiting the present invention. Examples of the present invention are identified by Arabic numerals. Comparative examples, which are not part of the present invention, are identified by alphabetic letters. All parts and percentages are on a weight basis unless otherwise stated.

EXAMPLE 1

Preparation of a Mixed Terephthalate Composition by Transesterification

A three-necked one-liter flask, equipped with a mechanical stirrer, a thermometer and a condensation apparatus, each of which was fitted into a separate neck by way of an adapter, was used as a reaction apparatus. The condensation apparatus had a second end remote from the flask. A dual purpose line connected to a vacuum pump and to a gaseous nitrogen source was also connected to the second end of the condensation apparatus. The flask was heated with a heating mantle controlled by a rheostat temperature controller.

A reaction mixture of 194 grams (1.0 mole) of dimethyl terephthalate, 587.5 grams (2.5 moles) of a mixture of alkylene glycol monoalkyl ethers and alkylene glycols, and 0.5 grams of calcium acetate were placed in the one-liter flask. The mixture of glycols and ethers which contained about 78 percent triethylene glycol butyl ether, about 12 percent tetraethylene glycol butyl ether, about 3 percent triethylene glycol, about 1 percent tetraethylene glycol and about 6 percent of a number of higher glycols and ethers, was commercially available from The Dow Chemical Company under the trade designation DOWANOL ® TBH.

The reaction mixture was heated, with stirring, to a set temperature of about 235° Centigrade at which point the reaction mixture was boiling and evolving methanol with the aid of a gaseous nitrogen purge. After removal of about 58 grams of methanol, equivalent to a conversion of about 90 percent, the reaction apparatus was placed under a reduced pressure of about 200 millimeters of mercury. The reduced pressure was maintained at that level for a period of 5 hours after which a reaction product generally free of methanol remained.

After removal of the methanol, some unreacted starting material (mixture of alkylene glycol monoalkyl ethers and alkylene glycols) remained. The reaction apparatus was placed under a reduced pressure of less than about 5 millimeters of mercury to remove most of the unreacted starting material. The reaction apparatus was then placed under atmospheric pressure in order to allow aqueous extraction of additional unreacted starting material and to provide a purified reaction product.

Aqueous extraction was accomplished by adding, with stirring, 400 grams of distilled water to the reaction product. Stirring was then stopped and the contents of the flask were allowed to separate into two layers, an aqueous layer and a product layer. After decanting to remove most of the aqueous layer, the product layer was dried at a temperature of 120° Centigrade with a gaseous nitrogen purge to remove residual water.

The dried product layer was analyzed with a high pressure liquid chromatograph, commercially available from IBM Corporation under the trade designation HPLC-9533. A refractive index detector and a C-18 column were used in conjunction with the chromatograph. The detector was commercially available from Varian Associates under the trade designation RI-3. The column was commercially available from IBM Corporation under the trade designation L-7138.

In order to analyze the dried product layer is was necessary to disolve 0.15 grams of the product layer in 3 milliliters of a 3:1 mixture of acetonitrile and water. The solution was then injected into the chromatograph at a flow rate of 1.0 millimeters per minute. Component retention times were measured and graphically recorded. By comparing the recorded retention times with known retention times, components were identified. In addition, comparison of areas under peaks on the graphic record provided a proportional breakdown of product layer components.

The analysis showed that the dried product layer comprised a mixture of terephthalic acid diesters, oligomers and a minor amount of starting material. The mixture of diesters was represented by the general formula

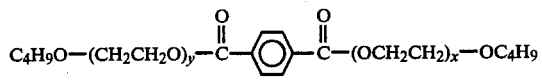

wherein x is 3 or 4 and y is 3 or 4.

A more specific breakdown of the product layer is as follows:

| Variable | | Retention Time | Percent of |
| --- | --- | --- | --- |
| x | y | (minutes) | Composition* |
| 3 | 3 | 7.0 | 62 |
| 4 | 4 | 6.4 | 3 |
| 3 | 4 | 6.6 | 24 |
| 4 | 3 | | |
| oligomers | | 7.8 | 10 |
| oligomers | | 8.7 | |

*One percent of the product layer composition comprised unreacted starting materials.

EXAMPLE 2

Preparation of a Mixed Terephthalate Composition by Direct Esterification

A three-necked one-liter flask, equipped with a mechanical stirrer, a thermometer and a Dean Stark trap, each of which was fitted into a separate neck by way of a stopper, was used as a reaction apparatus. The flask was heated with a heating mantle controlled by a rheostat temperature controller.

A reaction mixture of 166 grams (1.0 mole) of terephthalic acid, 580 grams (2.5 moles) of a mixture of alkylene glycol monoalkyl ethers and alkylene glycols, 15.0 grams of toluene sulfonic acid monohydrate, and 100 grams of toluene were placed in the one-liter flask. The mixture of glycols and ethers was identical to that used in Example 1.

The reaction mixture was heated, with stirring, to an initial set temperature of 150° Centigrade at which point esterification of the terephthalic acid began. As the esterification reaction proceeded, the reaction mixture was heated by the heating mantle in incremental steps to a temperature of 175° Centigrade. During the reaction, water, formed as a by-product, was removed via the trap by azeotropic distillation with toluene. The reaction was continued until a free terephthalic acid content of less than 0.1 percent, as determined by titration with a 0.1N solution of sodium hydroxide was attained.

The toluene sulfonic acid, used as a catalyst, was inactivated by reaction with excess ammonium bicarbonate after the reaction mixture had cooled to a temperature of from about 125° to about 135° Centigrade. The reaction produced an insoluble ammonium sulfonate salt. The reaction mixture was then filtered to remove the insoluble salt. The filtered reaction mixture was stripped of toluene by placing the reaction apparatus under a reduced pressure of 100 millimeters of mercury while maintaining the reaction mixture at a temperature of about 135° Centigrade for a period of time sufficient to remove generally all toluene therefrom. The reaction apparatus was then placed under a reduced pressure of about 5 millimeters of mercury at a temperature of 235° Centigrade to distill off excess glycol ether and leave a product. The reaction apparatus was then placed under atmospheric pressure in order to allow aqueous extraction of additional unreacted starting material and to provide a purified reaction product.

Aqueous extraction was accomplished as in Example 1 except that the drying was accomplished at a temperature of 30° Centigrade in the presence of magnesium sulfate rather than by a gaseous nitrogen purge at a temperature of 120° Centigrade.

Analysis of the purified reaction product of Example 2, using the same chromatograph as used in Example 1, showed that the mixture of Example 2 contained essentially the same breakdown of terephthalic acid diesters as that of Example 1.

Based upon the foregoing analyses, it is clear that either transesterification or direct esterification will provide acceptable results.

EXAMPLES 3-8

Preparation of Mixed Terephthalate Composition by Tranesterification

Using the procedure set forth in Example 1, a number of additional transesterification reaction products were prepared from a variety of glycol and glycol ether starting materials. The products, hereinafter designated as Examples 3-8 were first compounded in accordance with a polyvinyl chloride resin formulation and then processed into test plaques for physical property and performance testing. Two commercially available plasticizers, hereinafter designated as Comparative Examples A and B, were subjected to the same tests. Comparative Example A was trioctyl trimellitate, hereinafter TOTM, a monomeric plasticizer available from a number of sources, one of which is C. P. Hall Company. Comparative Example B was a polyester plasticizer, hereinafter PEP, available from C. P. Hall Company under the trade designation Paraplex ® G-54. The polyvinyl chloride formulation, hereinafter Formulation A, is shown in Table I.

TABLE I

Formulation A

| Amount (parts) | Component |
|---|---|
| 100 | a polyvinyl chloride resin commercially available from B. F. Goodrich Chemical Group under the trade designation GEON ® 103EP |
| 50 | plasticizer |
| 2 | a lead phthalate stabilizer commercially available from Associated Lead under the trade designation Dyphos ® XL. |
| 1 | Lead stearate |
| 0.2 | an antioxidant commercially available from Ciba Geigy under the trade designation Irganox ® 245. |

Preparation of Test Plaque

All dry components of Formulation A were mixed to form a visually homogeneous dry blend. The plasticizer was added to the dry blend and mixed until a visually uniform wet blend was obtained. The wet blend was placed on a two roll compounding mill which had a set temperature of 165° Centigrade for further mixing. The wet blend was mixed with the two roll mill for a period of five (5) minutes after fusion thereof to form a smooth, heat-plastified sheet. The sheet was then removed from the two roll mill for further processing.

Pieces of the sheet were compression molded to form a test plaque having a thickness of about 30 mils (7.62 meters). A hydraulic press having two opposing press plates was used for compression molding. A sample frame was interposed between the press plates to control sample thickness. In other words, sample thickness could be varied simply by changing the sample frame thickness.

The following sequence was used to prepare samples irrespective of sample frame thickness: (a) preheat the press plates and the sample frame to a temperature of 160° Centigrade; (b) place the pieces of sheet between the press plates and within the sample frame and then heat the pieces of sheet at a temperature of 160° Centigrade while applying a pressure of 5 tons (about 4545 kilograms) to said pieces and sample frame for a period of 2 minutes; (c) heating the pieces of sheet at the same temperature but at an increased pressure of 20 tons (about 18,180 kilograms) for a period of 3 minutes; and (d) cooling the press plates and the sample frame with ambient water (about 20° Centigrade) while maintaining the pressure at 20 tons (about 18,180 kilograms) for a period of 3 minutes. The samples, after being removed from the press, were conditioned for a period of 24 hours at a temperature of 23° Centigrade and a relative humidity of 50 percent prior to physical property and performance testing. Test bar specimens were cut from these samples after conditioning.

Tests used in determining physical properties of the test bar specimens are listed in Table II. Plasticizer efficiency is a calculated value determined by comparing 100 percent modulus of test plaques. The plaque having triocyl trimellitate as a plasticizer was used as a standard. The following equation was used to compute efficiency:

$$\text{Efficiency} = \frac{100\% \text{ Modulus of the plaque containing Trioctyl Trimellitate}}{100\% \text{ Modulus of Comparative Plaque}}$$

Increasingly large efficiency numbers mean that, as compared to triocytl trimellitate, less plasticizer is needed to accomplish a reduction in 100 percent modulus.

TABLE II

Physical Property Tests

| Test Name | |
|---|---|
| Tensile at Break | ASTM D-638 |
| One hundred percent modulus | ASTM D-638 |
| Elongation at break | ASTM D-638 |
| Hexane Extraction | ASTM ? at 23° Centigrade, (can you give me more specifics) |
| Volatility | ASTM D-1203 at a temperature of 87° Centigrade using plaques having a thickness of 30 mils (7.62 millimeters) |
| Low Temperature Brittleness (hereinafter "LTB") | ASTM D-746 using type T50 specimens |

Results of physical property tests are shown in Table III. Two starting materials were used in preparing the mixed terephthalate diesters of Examples 3–8, one starting material was dimethyl terephthalate. A second starting material was a glycol/glycol ether blend which varied with each of the examples. The glycol/glycol ether blend starting material is shown in Table III for each of the Examples 3–8.

TABLE III

PHYSICAL PROPERTY TEST RESULTS - FORMULATION A

| Plasticizer Example/ Comp Ex | Glycol/ Glycol Ether | 100% Modulus | Efficiency | Ultimate Tensile | Ultimate Elongation | LTB °C. | Volatility 1 Day | Volatility 7 Days | Hexane Extraction 4 Hours | Hexane Extraction 24 Hours |
|---|---|---|---|---|---|---|---|---|---|---|
| 3 | Triethylene glycol/ n-butyl ether | 1817 | 1.16 | 3191 | 348 | −21 | +1.88 | +4.55 | −0.23 | −0.41 |
| 4 | 75:25 blend of tetraethylene glycol/n-butyl ether with triethylene glycol w/n-butyl ether | 1783 | 1.18 | 3398 | 381 | −30 | +1.30 | +2.80 | −0.28 | −0.49 |
| 5 | diethylene glycol/n-butyl ether | 1715 | 1.23 | 2701 | 269 | −20 | +1.35 | +3.90 | −0.23 | −0.42 |
| 6 | tetraethylene glycol | 1846 | 1.14 | 3544 | 365 | −26 | +1.21 | +2.20 | −0.21 | −0.38 |

TABLE III-continued

PHYSICAL PROPERTY TEST RESULTS - FORMULATION A

| Plasticizer Example/ Comp Ex | Glycol/ Glycol Ether | 100% Modulus | Efficiency | Ultimate Tensile | Ultimate Elongation | LTB °C. | Volatility 1 Day | Volatility 7 Days | Hexane Extraction 4 Hours | Hexane Extraction 24 Hours |
|---|---|---|---|---|---|---|---|---|---|---|
| 7 | /n-butyl ether dipropylene glycol/methyl ether | 2200 | 0.96 | 3316 | 322 | −7 | +0.91 | +3.56 | −0.70 | −0.16 |
| 8 | glycol/ glycol ether blend of Example 1 | 1632 | 1.03 | 2937 | 365 | −30 | +2.40 | +4.90 | +1.20 | +1.40 |
| A | + | 2107 | 1.00 | 3077 | 370 | −28 | +0.27 | +0.71 | +11.5 | +11.8 |
| B | + | 2229 | 0.94 | 3209 | 364 | −10 | +0.38 | +0.94 | −0.27 | −0.68 |

+ not applicable

The data presented in Table III demonstrates that the mixed terephthalate diesters of the present invention are, with one exception, more efficient than either of the two commercially available plasticizers. That exception is the compound containing the mixed terephthalic acid diesters of Example 7. The mixed terephthalic acid diesters are also notably superior to trioctyl trimellitate (Comparative Example A) in terms of resistance to hexane extraction. Resistance to hexane extraction is indicative of resistance to human skin oils, a desirable attribute in applications such as luggage, handbags and other personal goods formed from a polymer material such as a vinyl chloride polymer.

The data presented in Table V further demonstrates that a particular group of mixed terephthalate diesters 4, 5, 6 and 8 possess a desirable and unique combination of properties. This combination includes low volatility, high plasticizing efficiency and good low temperature properties as well as satisfactory resistance to hexane extraction. The combination is desirable because it provides broad formulation latitude with relatively small amounts of plasticizer.

A common use for a plasticizer, either alone or in conjunction with other plasticizers, is as a component of a wire and cable jacketing or insulating formulation. Underwriters Laboratories rates a composition as "105° Centigrade" if the composition, when formed into a test bar having a thickness of about 16.5 millimeters, provides 65 percent retention of elongation and 75 percent retention of tensile strength after being aged in a forced air convection oven for a period of seven days at a temperature of 136° Centigrade.

A typical wire and cable jacketing formulation is shown in Table IV and designated as Formulation B.

TABLE IV

Formulation B

| Amount (parts) | Component |
|---|---|
| 100 | a polyvinyl chloride resin commercially available from Conoco Chemicals Company, a Division of Conoco Incorporated, under the trade designation PVC 5425 |
| 50 | plasticizer* |
| 10 | a lead stabilizer commercially available from Associated Lead Incorporated under the trade designation Dythal ® XL. |
| 10 | a kaolin clay filler commercially available from Freeport Kaolin Company under the trade designation SP33. |

*All plasticizers had added thereto 0.3 percent by weight of plasticizer of an antioxidant commercially available from ICI Americans, Inc. under the trade designation Topanol ® CA. The mixed terephthalic acid diesters of Examples 3-8 also had added thereto 0.3 percent by weight of plasticizer of an antioxidant commercially available from Ciba Geigy under the trade designation Irganox ® 245.

Compounds prepared in accordance with Formulation B were formed into test plaques using the procedure set forth hereinabove with respect to compounds prepared in accordance with Formulation A except that the sample frame had a thickness of 65 mils (16.51 millimeters) rather than 30 mils (7.62 millimeters). The materials evaluated were the mixed terephthalate prepared in Example 1 and Comparative Examples A and B. Physical Property test results are shown in Table VII.

TABLE V

PHYSICAL PROPERTY TEST RESULTS - FORMULATION B

| Plasticizer Example Comparative Example | 100% Modulus | Efficiency | Tensile Initial | Aged* | Percent Retained | Ultimate Elongation % Init | Ultimate Elongation Aged* | Ultimate Elongation % Ret | LTB (°C.) | Plasticizer |
|---|---|---|---|---|---|---|---|---|---|---|
| 1 | 1786 | 1.09 | 3150 | 2520 | 80 | 377 | 305 | 81 | −34 | Mixed Terephthalate |
| A | 2155 | 0.90 | 3107 | 2579 | 83 | 409 | 307 | 75 | −16 | PEP** |
| B | 1946 | 1.0 | 2823 | 2654 | 94 | 383 | 322 | 84 | −34 | TOTM** |

*Property measured after aging in a forced air convection oven for a period of seven days at a temperature of 136° Centigrade.
**See Table II for an explanation of the abbreviation.

The data presented in Table V demonstrates that the mixed terephthalates of the present invention meet the requirements for an Underwriters Laboratories' rating of 105° Centigrade. The data also demonstrates that the mixed terephthalates are a more efficient plasticizer than either of those with which a comparison was made. The data further demonstrates that the mixed terephthalates of the present invention have good strength as indicated by the combination of high ultimate tensile and low 100 percent modulus.

Similar results are obtained with other mixed terephthalate compounds which are representative of the present invention.

EXAMPLE 9

Preparation of a Mixed Trimellitate Composition by Direct Esterification

A three-necked one-liter flask, equipped with a mechanical stirrer, a thermometer and a Dean Stark trap, each of which was fitted into a separate neck by way of a stopper, was used as a reaction apparatus. The flask was heated with a heating mantle controlled by a rheostat temperature controller.

A reaction mixture of 192 grams (1.0 mole) of trimellitic anhydride, 928 grams (4 moles) of a mixture of alkylene glycol monoalkyl ethers and alkylene glycols, 15.0 grams of toluene sulfonic acid monohydrate, and 100 grams of toluene were placed in the one-liter flask. The mixture of glycols and ethers was identical to that used in Example 1.

The reaction mixture was heated, with stirring, to an initial set temperature of 150° Centigrade at which point esterification of the trimellitic acid began. As the esterification reaction proceeded, the reaction mixture was heated by the heating mantle in incremental steps to a temperature of 190° Centigrade. During the reaction water formed as a by-product, was removed via the trap by azeotropic distillation with toluene. The reaction was continued until a free acid content of less than 0.1 percent, as determined by titration with 0.1N NaOH was attained.

The toluene sulfonic acid, which was used as a catalyst, was inactivated by reaction with excess ammonium bicarbonate after the reaction mixture had cooled to a temperature of from about 125° to about 135° Centigrade. The reaction produced an insoluble ammonium sulfonate salt. The reaction mixture was then filtered to remove the insoluble salt. The filtered reaction mixture was stripped of toluene by placing the reaction apparatus under a reduced pressure of 100 millimeters of mercury and maintained at a temperature 135° Centigrade for a period of time sufficient to remove generally all toluene therefrom. The reaction apparatus was then placed under a reduced pressure of about 5 millimeters of mercury at a temperature of 235° Centigrade to distill off excess glycol ether and leave a product. The reaction apparatus was then placed under atmospheric pressure in order to allow aqueous extraction of additional unreacted starting material and to provide a purified reaction product.

Compounds incorporating either the mixed trimellitate composition of Example 9 or trioctyltrimellitate (Comparative Example A) were prepared in accordance with Formulation A (Table I) and Formulation B (Table IV). These compounds were then formed into test plaques having a thickness of either 7.62 millimeters (Formulation A) or 16.51 millimeters (Formulation B). The test plaques, after being conditioned, were subjected to physical property testing. Physical property testing included those listed in Table II. Physical property test results for Formulation A compounds are shown in Table VI. Physical property test results for Formulation B compounds are shown in Table VII.

TABLE VI

PHYSICAL PROPERTY TEST RESULTS - FORMULATION A

| Plasticizer Example/ Comparative Example | 100 Percent Modulus | Tensile Initial | Ultimate Elongation Percent | Percent Hexane Extraction 4 Hours | 24 Hours |
|---|---|---|---|---|---|
| 9 | 2188 | 3582 | 347 | 0.15 | 1.2 |
| A | 2117 | 3425 | 380 | 13.3 | 15.0 |

The data presented in Table VI shows that the mixed trimellitates of the present invention are generally comparable to trioctyltrimellitate except in the area of hexane extraction. The mixed trimellitates of the present invention have surprisingly low susceptibility to hexane extraction. Similar results are obtained with other mixed trimellitate compounds which are representative of the present invention.

TABLE VII

PHYSICAL PROPERTY TEST RESULTS - FORMULATION B

| Plasticizer Example/ Comparative Example | 100 Percent Modulus | Tensile Strength Initial | Aged* | % Retained | Percent Elongation Initial | Aged* | % Retained |
|---|---|---|---|---|---|---|---|
| 9 | 1952 | 3233 | 2554 | 79 | 387 | 344 | 89 |
| A | 1946 | 2823 | 2654 | 94 | 383 | 322 | 84 |

*Property measured after aging in a forced air convection oven for a period of seven days at a temperature of 136° Centigrade.

The data presented in Table IX shows that the mixed trimellitate compounds, like trioctylmellitate, yield an Underwriters' Laboratories' rating of 105° Centigrade when prepared in accordance with Formulation B at a sample thickness of about 16.5 millimeters. Similar results are obtained with other mixed trimellitate compounds representative of the present invention.

What is claimed is:

1. A halogen-containing resin composition which comprises (a) a halogen-containing resin and (b) a plasticizing amount of a mixture of at least two diesters of terephthalic acid, said diesters being of the general formula

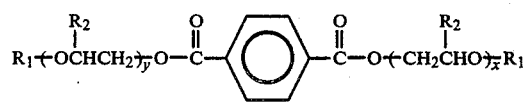

wherein $R_1$ is an aphenyl radical or an aliphatic hydrocarbon radical of the formula $C_nH_m$, wherein n is an integer of 1 through 8 inclusive and m is equal to $2n+1$; $R_2$ is either hydrogen or an aliphatic hydrocarbon radical having one, two, three or four carbon atoms; x is an integer of 2 to 4 inclusive; and y is an integer of 2 to 4 inclusive.

2. The resin composition of claim 1 wherein the halogen-containing resin is a vinyl chloride resin.

3. The resin composition of claim 2 wherein the vinyl chloride resin is a copolymer selected from the group consisting of vinyl chloride/vinyl acetate copolymers, vinyl chloride/vinylidene chloride copolymers, vinyl chloride/ethylene copolymers and graft copolymers of vinyl chloride onto an ethylene/vinyl acetate copolymer.

4. The resin composition of claim 1 wherein the halogen-containing resin is a blend of a vinyl chloride resin and a polymer selected from the group consisting of methacryl polymers and acrylonitrile/butadiene/styrene interpolymers.

5. The resin composition of claim 1 wherein the plasticizing amount is from about 2 to about 80 parts by weight per hundred parts of halogen-containing resin.

6. A halogen-containing resin compositon which comprises (a) a halogen-containing resin and (b) a plasticizing amount of at least two triesters of trimellitic acid, said triesters being of the general formula

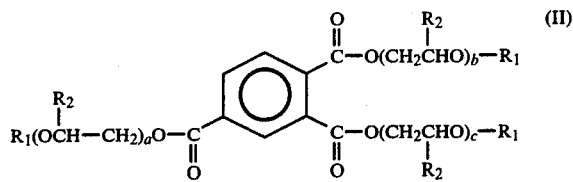

wherein $R_1$ is a phenyl radical or an aliphatic hydrocarbon radical of the formula $C_nH_m$ wherein n is an integer of 1 through 8 inclusive and m is equal to $2n+1$; $R_2$ is either hydrogen or an aliphatic hydrocarbon radical having one, two, three or four carbon atoms; a is 2, 3 or 4; b is 2, 3 or 4; and c is 2, 3 or 4.

7. The resin composition of claim 6 wherein the halogen-containing resin is a vinyl chloride resin.

8. The resin composition of claim 7 wherein the vinyl chloride resin is a copolymer selected from the group consisting of vinyl chloride/vinyl acetate copolymers, vinyl chloride/vinylidene chloride copolymers, vinyl chloride/ethylene copolymers and graft copolymers of vinyl chloride onto an ethylene/vinyl acetate copolymer.

9. The resin composition of claim 6 wherein the halogen-containing resin is a blend of a vinyl chloride resin and a polymer selected from the group consisting of methacryl polymers and acrylonitrile/butadiene/styrene interpolymers.

10. The resin composition of claim 6 wherein the plasticizing amount is from about 2 to about 80 parts by weight per hundred parts of halogen-containing resin.

* * * * *